C. F. EATON, Jr.
AVERAGE SPEED METER.
APPLICATION FILED JUNE 6, 1918.
1,343,198.
Patented June 15, 1920.
3 SHEETS—SHEET 1.
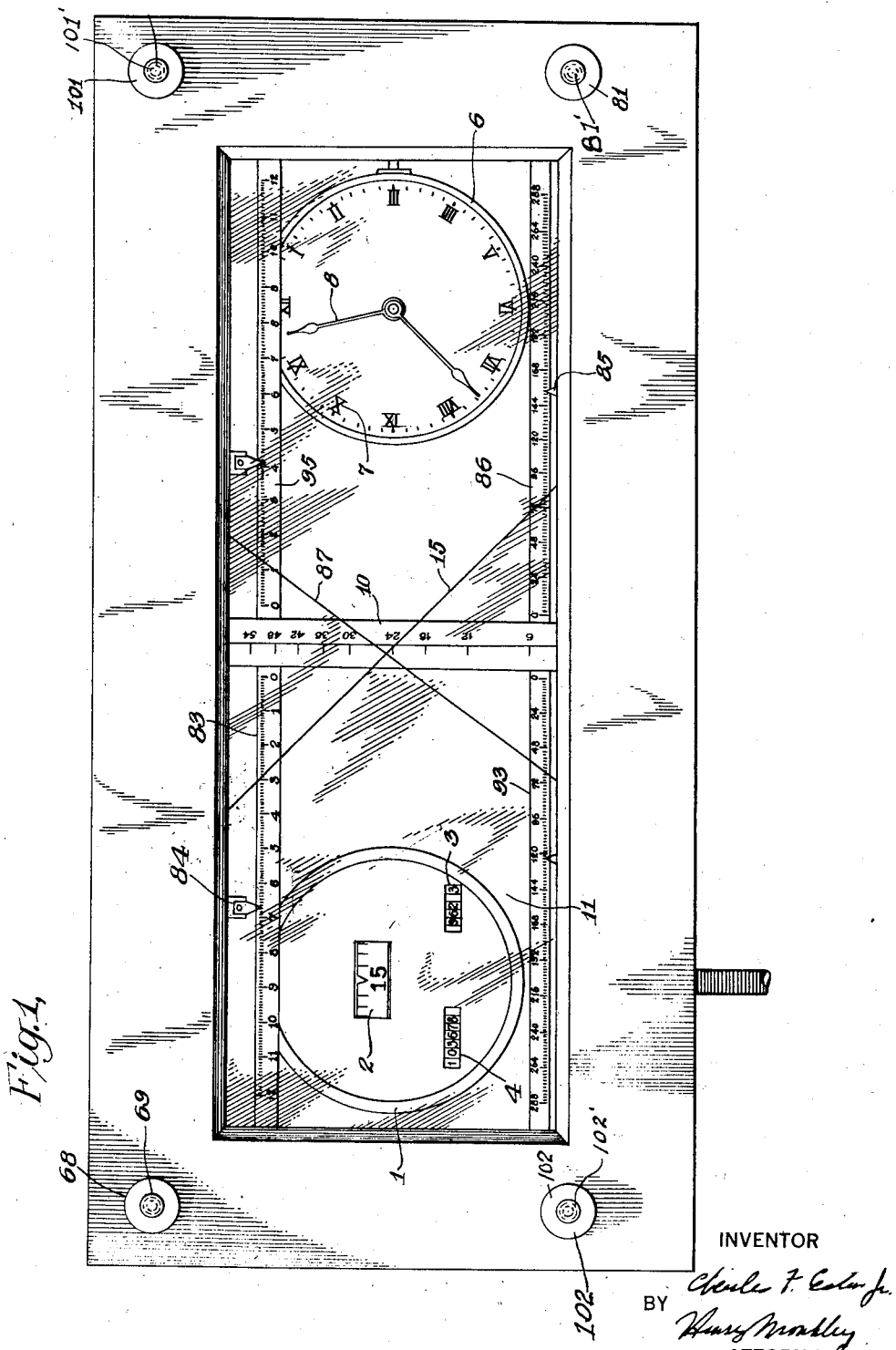
INVENTOR
Charles F. Eaton Jr.
BY
Henry Mosley
ATTORNEY C. F. EATON, Jr.
AVERAGE SPEED METER.
APPLICATION FILED JUNE 6, 1918.
1,343,198.
Patented June 15, 1920.
3 SHEETS—SHEET 2.
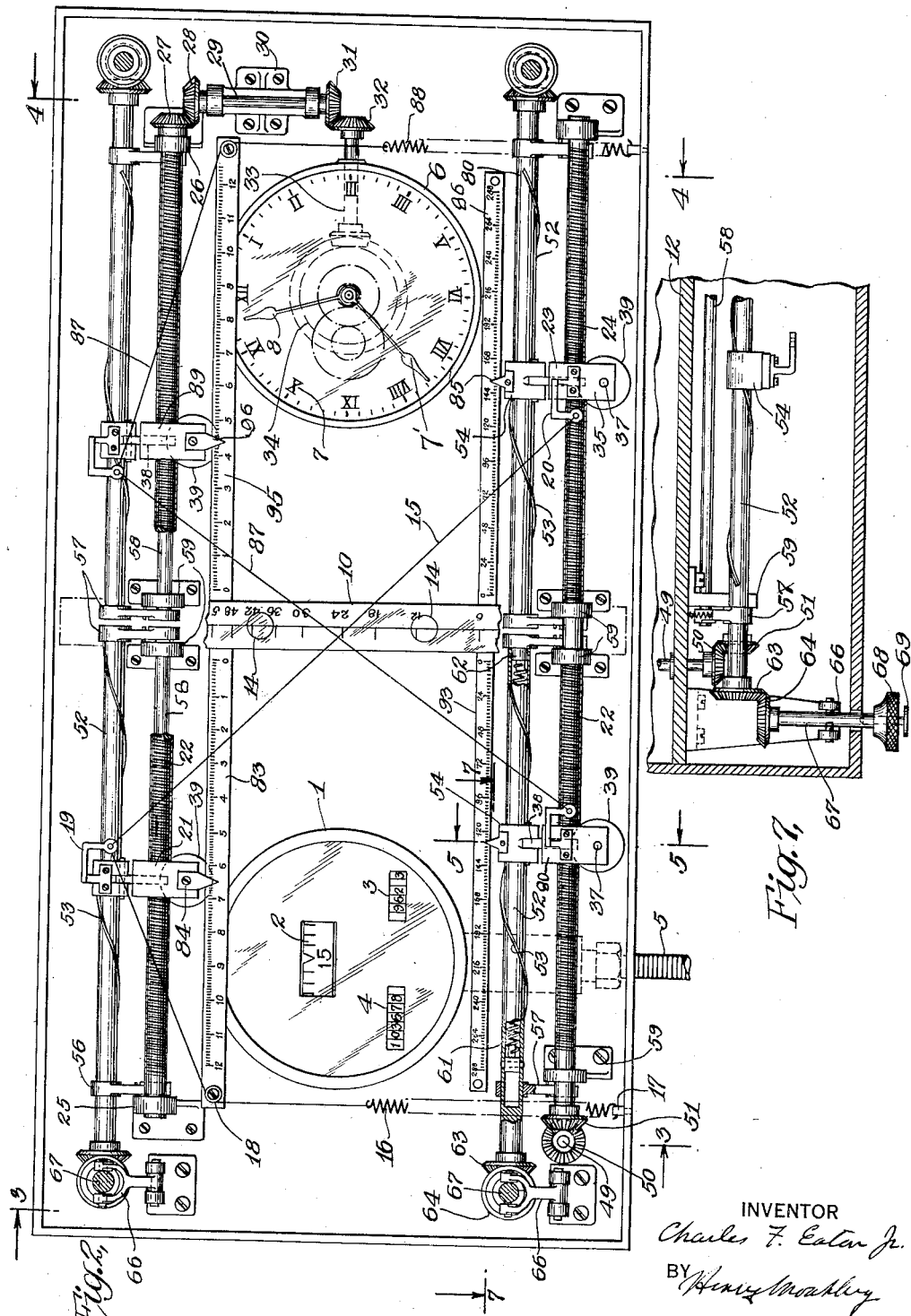
INVENTOR
Charles F. Eaton Jr.
BY Henry Moakley
ATTORNEY

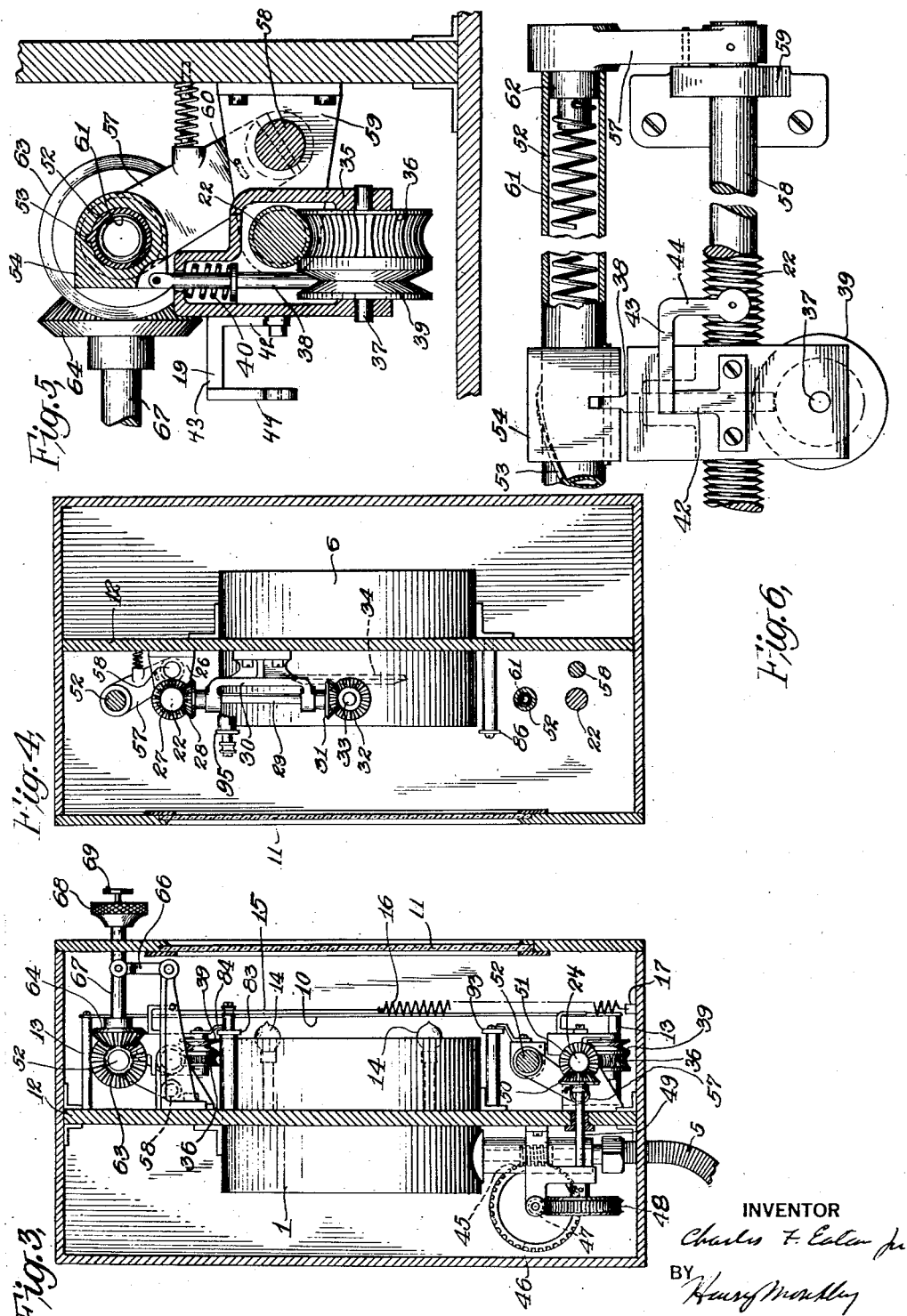

UNITED STATES PATENT OFFICE.

CHARLES F. EATON, JR., OF NEW YORK, N. Y.

AVERAGE-SPEED METER.

1,343,198.

Specification of Letters Patent.   Patented June 15, 1920.

Application filed June 6, 1918.   Serial No. 238,472.

*To all whom it may concern:*

Be it known that I, CHARLES F. EATON, Jr., a citizen of the United States, residing at 371 East 204th street, New York City, in the borough of Bronx, State of New York, have invented new and useful Improvements in Average-Speed Meters, of which the following is a specification.

This invention relates to calculating machines and has for its general object the provision of an instrument for giving an indication of the quotient of two factors, which increase or decrease at variable rates.

The invention is particularly adapted for use with motor vehicles, where it is used to give an indication of the average speed at which the vehicle has traveled for a determined period of time or for giving an indication of the speed at which the vehicle should travel in order to cover a predetermined distance in a predetermined time interval or for giving combined readings of both of these average speeds.

In the preferred form of the invention the device contemplates a scale and a flexible indicating member which intersects the scale and serves as a pointer to give the proper reading. The flexible member forms, with the scale, two right-angle triangles whose bases are varied in accordance with the time and distance to vary the position of the flexible member so that by properly calibrating the scale the point of intersection of the scale and the flexible member will give a direct reading of the average speed which the vehicle has traveled. If the bases of the triangles are first laid off in accordance with the total distance and the total time in which the distance should be covered and the bases of the triangles then decreased in accordance with the distance traveled and also in accordance with the elapsing time, the flexible member will give an indication of the average speed at which the vehicle should travel in order to complete the distance in the time available.

In order to provide for the variation in the bases of the triangles, traveling nuts or members are utilized, which are connected to the ends of the flexible member or cord. Means are also provided for resetting these traveling members at the end of a trip.

The invention will also be clear from the detailed description hereinafter to follow, taken in connection with the drawings, and will be particularly pointed out in the appended claims.

In the drawings,

Figure 1 is a plan of the invention, constructed in accordance with the principles of the invention;

Fig. 2 is a view similar to Fig. 1, with the front of the casing removed;

Fig. 3 is a section on the line 3—3 of Fig. 2;

Fig. 4 is a section on the line 4—4 of Fig. 2;

Fig. 5 is a section on the line 5—5 of Fig. 2, showing an end view of the resetting mechanism;

Fig. 6 is a front view of Fig. 5; and

Fig. 7 is a section on the line 7—7 of Fig. 2, showing a part of the resetting mechanism.

The instrument is adapted to be combined with the usual type of speedometer at present used, which is indicated 1. This speedometer, as is the usual practice, consists of an instantaneous speed scale 2, a trip counter 3, and a season counter 4. The speedometer is driven by means of a flexible shaft 5, a portion of which is shown in Fig. 2, and which is adapted to be connected to the wheels of the vehicle (not shown), in the usual manner.

The instrument is also combined with a clock 6 which is provided with a dial 7, a minute hand 7', and an hour hand 8. These two devices are utilized to drive parts of the instrument, as will be later described.

Referring now to the instrument. The portion of the same which is utilized to determine the average speed at which the vehicle has traveled for a determined time will first be described. This consists of a scale 10 which is shown medially disposed within the casing 1, which casing is provided with a glass covered opening through which the scale 10 and the speedometer 1 and clock 6 are visible. The scale 10 is divided into divisions of unequal length, the scale running from zero speed at the bottom to a speed 54 miles an hour at the top, the intermediate speeds between these minimum and maximum limits being indicated by divisions marked 6, 12, etc.; and it is to be understood that in practice, if desired, each mile may be shown by a separate division.

Referring to Fig. 3, it will be seen that the scale 10 is supported from a partition wall 12 by means of posts 13. The scale is preferably of translucent material and is lighted at night by means of small electric lamps 14. The partition wall 12 also serves as a support for the speedometer and clock, as will be clear from Figs. 3 and 4, the clock and speedometer casings passing through suitable openings in this wall.

The indicating member associated with the scale 10 consists of a flexible cord 15, one end of which is secured to a spring 16, which is in turn secured to the casing, as at 17. The cord passes over an idler or small roller 18 and through an eye in an arm 19 carried by a traveling nut to an arm 20 of another traveling nut, to which it is fastened. The traveling nuts which carry the arms 19 and 20 are of a similar construction, the traveling nut 21 which carries the arm 19 being mounted upon a screw shaft 22 and the traveling nut 23 which carries the arm 20 being mounted upon a screw shaft 24. The screw shaft 22 extends substantially the entire length and is journaled at one end in a bearing 25 and at the other end in a bearing 26. The end of the shaft adjacent the bearing 26 carries a beveled gear 27 which meshes with a similar beveled gear 28 carried by a short shaft 29, which is journaled in a bracket 30 carried by the partition wall 12 of the casing (see Fig. 4). The shaft 29 carries a beveled gear 31 which is driven by a beveled gear 32 connected to a shaft 33. This shaft 33 is adapted to be driven by the mechanism which drives the clock 6, as is indicated by the gears 34, shown in dotted lines. It is therefore evident that the shaft 22 is rotated at a speed proportional to the time. The rotation of the shaft 22 translates the traveling nut 21 to the left. This nut is constructed as is shown in Figs. 5 and 6, consisting of a yoke 35 which carries a worm 36 upon a shaft 37. This worm meshes with the shaft 22 and is normally held from rotation by a brake pin 38 to cause the nut to travel when the shaft 22 is rotated. The pin 38 has a pointed end which engages in a V-grooved brake wheel 39 mounted concentrically with the worm 36 and rotating with it. The brake pin 38 is normally pressed to its braking position by a spring 40. The arm 19 is fastened to the yoke 35 and comprises a shank 42, a bent intermediate part 43 and an end portion 44 which carries the eye through which the flexible cord 15 passes. When the brake pin 38 is released from the tension of the spring 40 the worm 36 is free to turn, which will permit it to rotate when the traveling nut is displaced laterally along the screw 22 for resetting the instrument, as will be later described.

The traveling nut 23, which is mounted upon the screw shaft 24, is of a similar construction and the rotation of the screw shaft 24 in accordance with the distance, is effected by the construction shown in Fig. 3. Here the flexible shaft 5 which drives the speedometer, drives a worm 45 meshing with a worm wheel 46, which is connected to a worm 47 which meshes with a worm wheel 48 carried by a shaft 49, and in this manner a double worm reduction is obtained, so that while the speed of the shaft 49 is proportionate to the speed of the shaft 5 it rotates at a greatly reduced speed. The shaft 49 carries a beveled gear 50 which meshes with a beveled gear 51 upon the shaft 24, so that the displacement of the shaft 24 is proportional to the distance traveled by the vehicle.

If, therefore, the traveling nuts 21 and 23 are disposed upon the shafts 22 and 24 so that the flexible cord 15 is in alinement with the vertical line upon the scale 10 and the instruments set into operation, the movement of the traveling nut 23 to the right will be proportional to the distance and the movement of the traveling nut 21 to the left will be proportional to the time. The thread or flexible cord 15 will therefore gradually assume an angular position, as shown in Fig. 2, forming two right angle triangles, the bases for which are proportional to the distance and the time, respectively. It will therefore be apparent that if the scale upon the scale panel 10 is properly calibrated the intersection of the cord with the vertical line upon the scale panel will determine the average speed at which the vehicle has traveled.

Referring now to the manner in which the traveling members 23 and 21 are reset after the instrument has been in operation. From Fig. 2 it will be clear that above the shaft 22 is a shaft 52, which shaft carries a cam thread 53. The shaft 52 passes through a block 54 which is provided with a groove with which the cam 53 engages. This block 54 supports the brake pin 38, which pin, therefore, serves as the connection between the block 54 and the traveling nut 21. It will therefore be apparent that a rotation of the shaft 52 will cause a displacement of the traveling nut 21 if the brake pin 38 has been released, so that the worm 36 is free to rotate. As will also be clear from Fig. 2, the shaft 52 is journaled in bearings 56 and 57, which bearings constitute rocker arms, the other ends of which are secured to a shaft 58, which is supported by the partition wall 13 by means of bearings 59. The rocking movement of the arm 57 is limited by a pin and slot 60 (see Fig. 5). However, this slight rocking movement is sufficient to permit the shaft 52 to be lifted sufficiently to cause the block 54 to lift the brake pin 38 against the spring 40 and permit the free rotation of the worm 36. The shaft 52 is preferably hollow and surrounds a spring 61, one end of which is fastened to the shaft and the other end to a support 62 carried by the rocker arm 57. The shaft 52 rotates upon this support 62, as will be clear from Fig. 6. When the spring 61 is under tension the rotation of the shaft 52 is in a direction to cause the traveling nut 21 to return to its normal position, and it will be clear that the unwinding of the spring due to the rotation of the shaft necessary to bring the nut 21 to its normal position is taken care of by the rewinding of the spring, due to the rotation of the shaft 52 as the block 54 moves along the shaft simultaneously with the traveling nut 21. The shaft 52 and the associated parts described therefore constitute the resetting mechanism, which is controlled as disclosed in Fig. 7.

The shaft 52 projects through the rocker arm 56 and carries at its end a beveled gear 63, which is normally out of mesh with a gear 64 carried upon a shaft 67. The shaft 67 is adapted to oscillate and is carried by a yoke 66. The shaft 65 carries at its outer end a knurled head 68, which head is provided with a pin 69 freely rotatable therein. It is therefore evident that when the head 68 is pressed inwardly this movement is communicated to the shaft 67 and the gear 64 will engage with the gear 63 and rock the shaft 52 to draw the braking pin 38 out of engagement with the brake wheel 39, and unless the knurled head 68 is held the tension of the spring 61 within the shaft 52 will cause a rotation of this shaft and hence return the traveling nut 21 to its normal position. It is for this purpose that the pin 69 is provided, since it affords a means for pressing in upon the head 68 without interfering with its rotation. To control the rotation of the shaft 52 to reset the traveling nut, the knurled head 68 is held and is released gradually to permit its rotation and the speed of the shaft 52 will be thus controlled, since this shaft is connected to the head 68 through the gears 63 and 64.

The traveling nut 23 is also reset by means of a similar shaft 52 which is also provided with similar resetting mechanism which is controlled by a thumb nut 81 (see Fig. 1).

The operation of the device thus far will be clear from the description of the instrument. To reset the instrument the thumb nuts 68 and 81 are pressed inwardly, which will bring the traveling nuts to their central position. The device is then ready for use and the clock is started. As the vehicle advances, the rotation of the shaft 24 will gradually move the nut 23 to the right and the clock will move the nut 21 to the left, the flexible cord 15 assuming an angular position and indicating upon the scale 10 the average speed at which the vehicle has traveled. The instrument is designed to take care of a run of 12 hours' duration, and the time consumed will be indicated upon the scale 83 by a pointer 84 carried by the traveling nut 21 (see Fig. 1). The distance for a trip consuming 12 hours has been placed at 288 miles, the distance covered being shown by a pointer 85 upon a scale 86, the pointer 85 being carried by the traveling nut 23. It is to be understood that other factors than 12 and 28 can be selected if desired, and the scale 10 calibrated accordingly.

Referring now to the portion of the instrument which is adapted to give the average speed at which a vehicle should travel in order to complete a given trip within a predetermined time. The construction of this portion of the instrument is in general similar to that previously described and consists of a flexible cord 87, which intersects the scale 10, as does the cord 15. This cord is secured at one end to a spring 88 and is carried by two traveling nuts 89 and 90, which are of the same construction as the nuts 21 and 23. The resetting mechanism for these nuts are also the same and need not be described, being controlled by the thumb nuts 91 and 92, shown in Fig. 1 of the drawing. In operation, however, the traveling nut 90 is initially displaced to the left a distance corresponding to the total distance to be covered. This will be indicated upon a scale 93 similar to the scale 86 by a pointer 94 carried by the traveling nut 90. In the same manner the traveling nut 81 is initially displaced to the right a distance corresponding to the time allotted for covering the total distance, which will be indicated upon a scale 95 by means of a pointer 96 carried by the traveling nut 89. When, therefore, the instrument is set into operation as described, the traveling nut 89 will move to the left and the traveling nut 90 to the right, and the intersection of the cord 87 with the scale 10 will give a continuous reading of the speed at which the vehicle should travel in order to cover the remaining distance in the allotted period of time. It may be stated that in setting this portion of the device the knurled heads 101 and 102 will be used rather than the pins 101' and 102' carried thereby, since it is necessary to control the speed of rotation of their resetting shafts in order to properly set them at the desired time and distance intervals, as shown by the scales 93 and 95.

It should also be noted that if both wires are used as disclosed in the embodiment of the invention described, then the intersection of the two wires to the left of the center line 10 (see Fig. 2) denotes that the vehicle is behind time, whereas if the wires intersect to the right of the center line, then the vehicle is ahead of time.

It is also evident that the clock may be rewound by means of a shaft extending from the ordinary winding mechanism of the clock to the outside casing. Counters 3 and 4 may be reset in a similar manner, as is obvious to any one skilled in the art and as is shown in Patent No. 1,307,157.

While the invention has been described in conjunction with an average speedometer for motor vehicles it is evident that the invention may be utilized for other purposes, and it is intended that such modifications thereof shall come within the scope of the invention as set forth in the appended claims.

I claim:

1. In a calculating instrument, a pair of parallel screw shafts, traveling nuts carried by said shafts, clutches for connecting said nuts to said shafts whereby upon rotation of said shafts said nuts will be translated, indicating mechanism carried by said nuts, separate means for rotating each of said shafts, and resetting mechanism connected to said clutches for returning said nuts to their normal position after being displaced by the rotation of said shafts.

2. In an average speedometer, a movable part, time controlled means for displacing said part proportionally to the elapsing time, a second movable part, means for displacing said second named part proportionally to the distance, a member connecting said parts, and an average speed scale intersected by said flexible member.

3. In an average speedometer, a movable part, time controlled means for displacing said part proportionally to the elapsing time, a second movable part, means for displacing said second named part proportionally to the distance, said parts moving in parallel paths, a member connecting said parts, and an average speed scale associated with said member arranged at right angles to the paths of movements of said parts.

4. In an average speedometer, an average speed scale, a movable member intersecting said speed scale and forming two triangles therewith, one of said triangles having a base proportional to the time and the other of said triangles having a base proportional to the distance, and means for moving said member to maintain the bases of said triangles proportional to the time and distance, respectively.

5. In an average speedometer, an average speed scale, a flexible cord intersecting said scale, a pair of parallel screw shafts, a pair of traveling nuts carried by said shafts connected to said cord, time controlled means for rotating one of said shafts, and distance controlled means for rotating the other of said shafts.

6. In an average speedometer, an average speed scale, a member intersecting said scale, a pair of movable members for moving said member relatively to said scale, means for manually displacing said parts in one direction proportionally to the total time and distance respectively, and time controlled means and distance controlled means for displacing said parts respectively in the opposite direction.

7. In an average speedometer, an average speed scale, a member intersecting said scale, a pair of movable parts connected to the ends of said member for moving said member relatively to said scale, time controlled and distance controlled means for displacing said parts respectively, and means for automatically returning said parts to their normal positions.

8. In an average speedometer, an average speed scale, a flexible cord intersecting said scale, a pair of parallel screw shafts, traveling nuts carried by said shafts for moving said cord relatively to said scale, time controlled and distance controlled means for rotating said shafts, and manually controlled spring operated means for returning said nuts to their normal positions.

9. In an average speedometer, an average speed scale, a flexible cord intersecting said scale, a pair of parallel screw shafts, traveling nuts carried by said shafts for connecting with said cord for moving it relatively to said scale, clutches for controlling the engagement of said nuts with said shafts, and manually controlled means for actuating said clutches and for displacing said parts independently of said screw shafts.

10. An instrument comprising a casing, a speed meter in said casing, a clock within said casing, an average speed meter having a part movable proportional to time and a second part movable proportional to distance, connections from said speed meter to the first of said parts, and connections from said clock to the second of said parts.

CHARLES F. EATON, Jr.